Jan. 16, 1934. C. G. GUSTAFSON 1,943,937
ROTARY INTERNAL COMBUSTION ENGINE
Filed Jan. 5, 1931 4 Sheets-Sheet 4
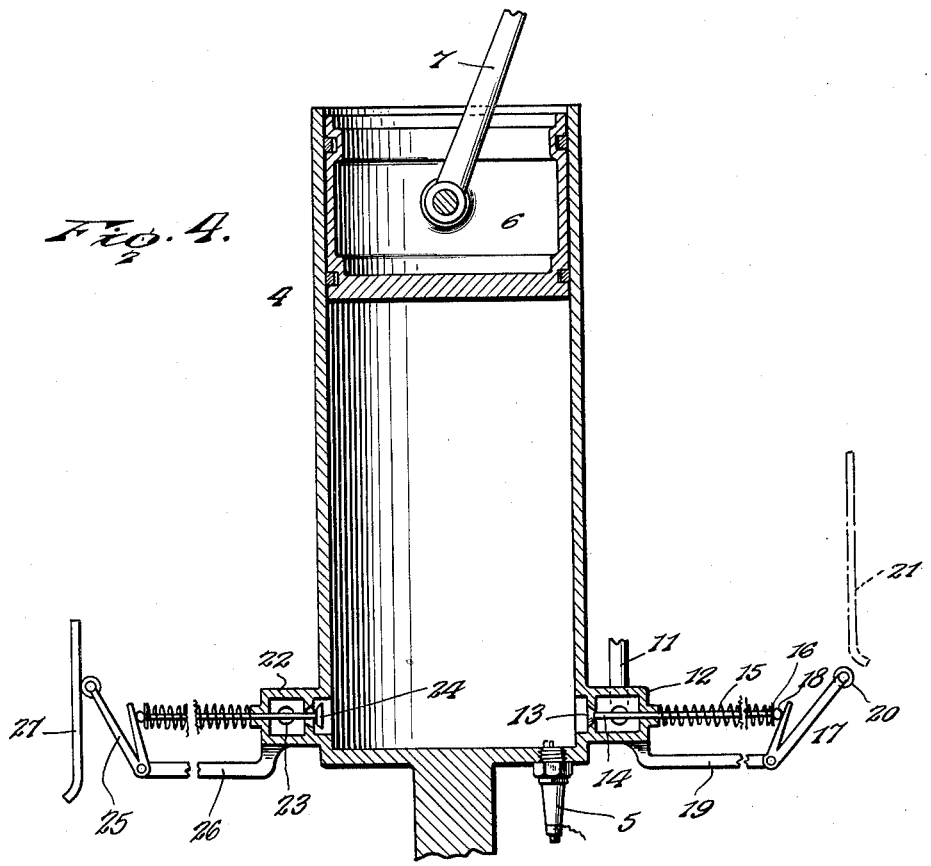
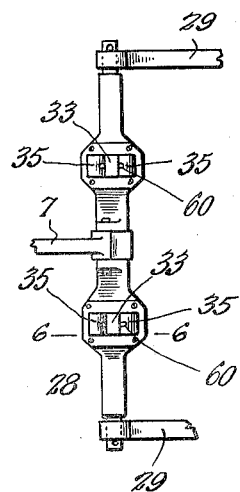
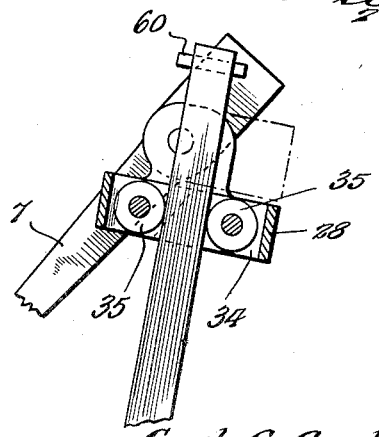
Inventor
Carl G. Gustafson.
By
Lacey & Lacey,
Attorneys Patented Jan. 16, 1934

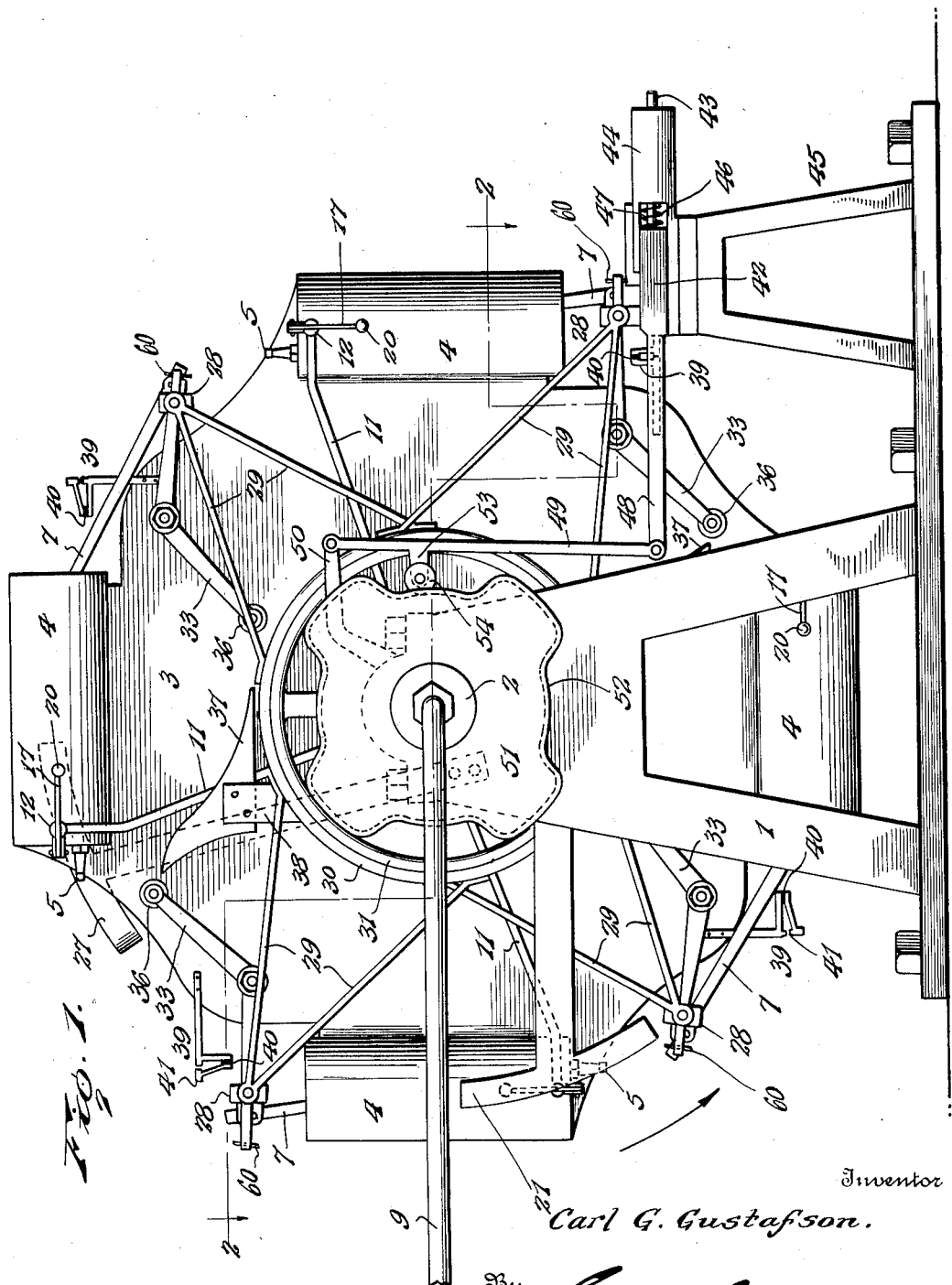

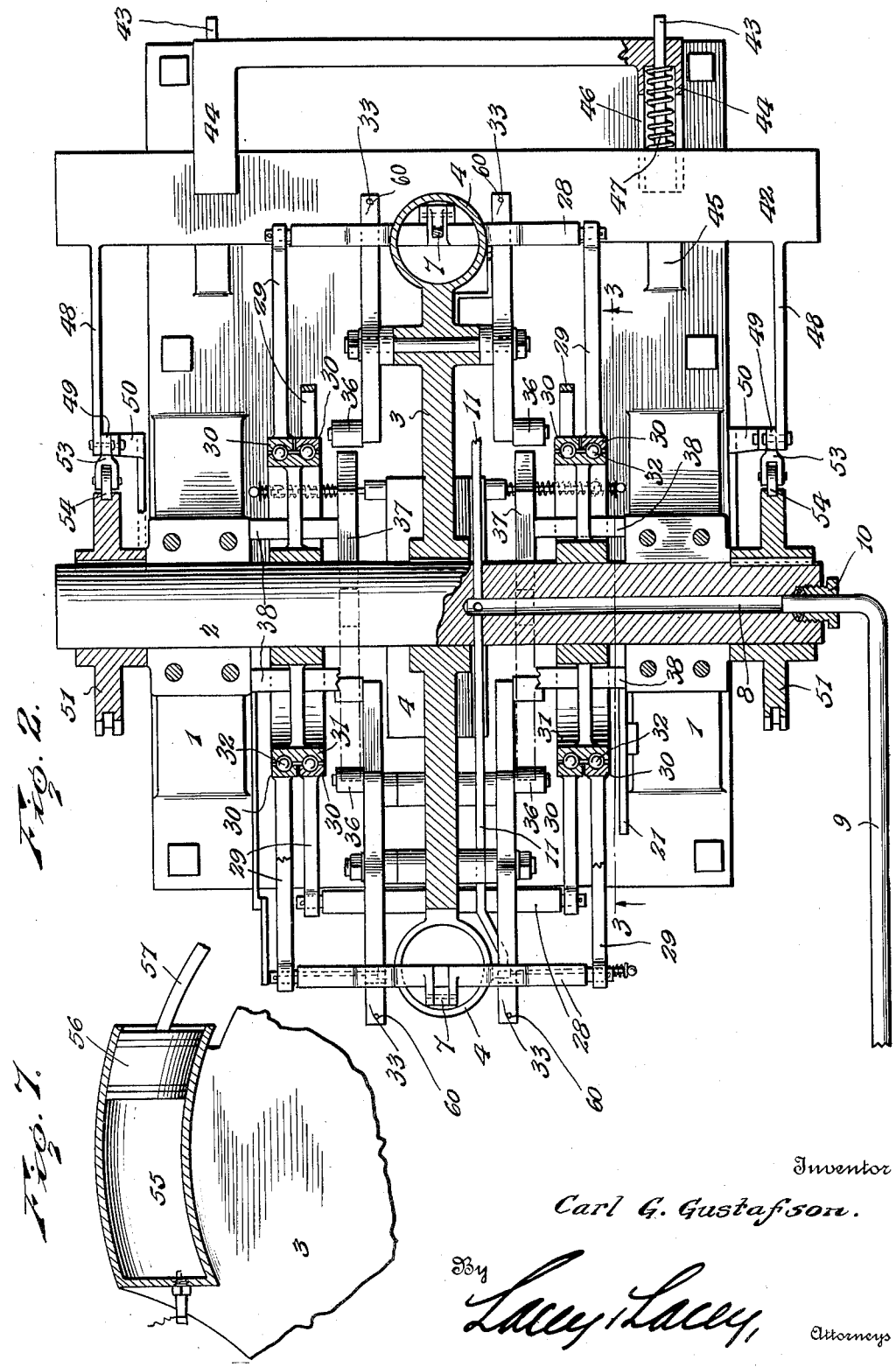

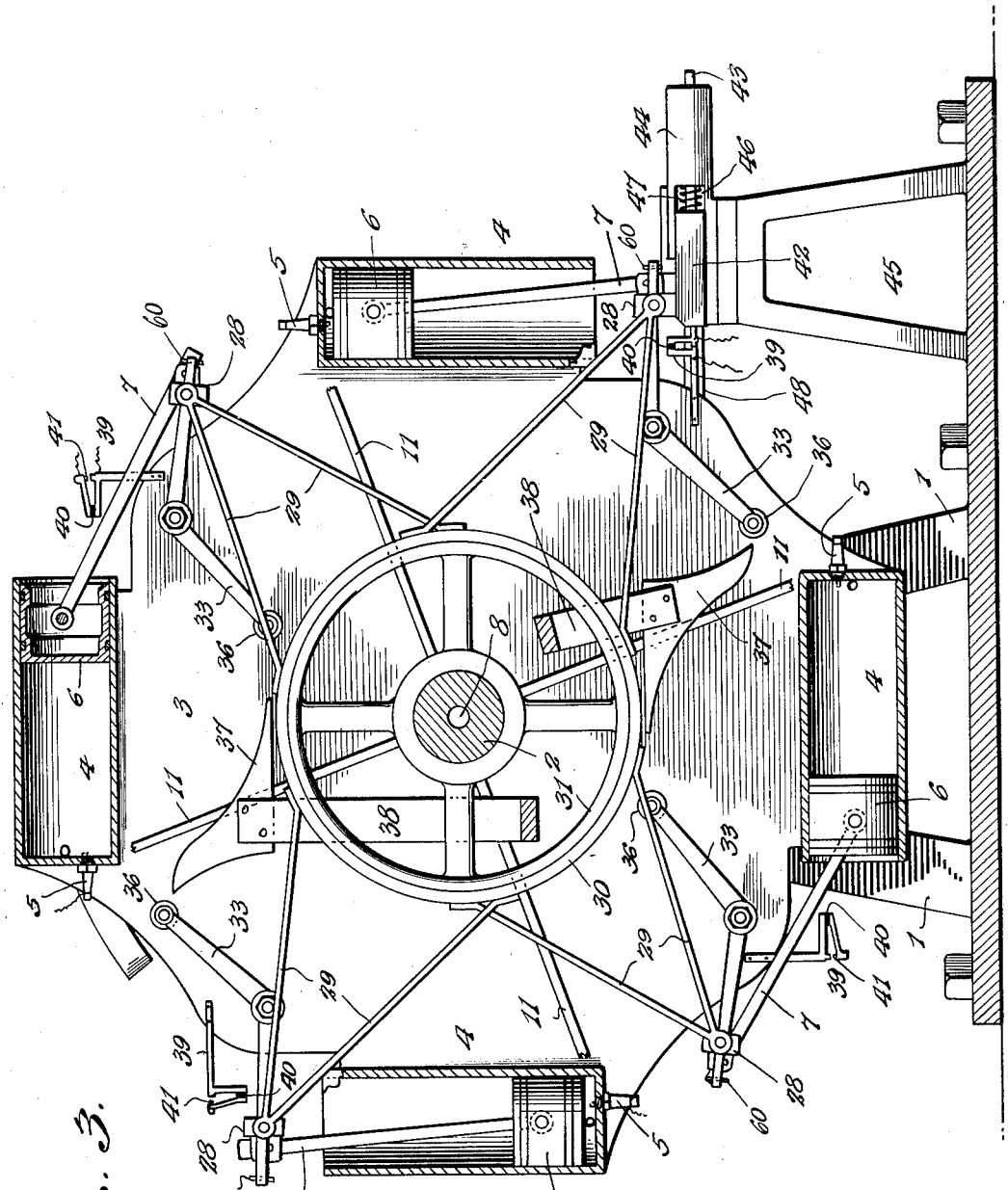

1,943,937

UNITED STATES PATENT OFFICE 1,943,937

ROTARY INTERNAL COMBUSTION ENGINE

Carl Gustaf Gustafson, Brooklyn, N. Y.

Application January 5, 1931. Serial No. 506,730

5 Claims. (Cl. 123—43)

The object of this invention is to provide a rotary engine in which the power generated will be more effectually utilized than in engines of the rotary type heretofore developed. The invention applies the generated power directly to the motor shaft instead of indirectly through trains of gearing or other operating connections which generate friction and for other reasons consume power which in my engine is applied to the performance of useful work. The invention is illustrated in the accompanying drawings and consists in certain novel features which will be hereinafter fully set forth and defined.

In the drawings:

Figure 1 is a side elevation of an engine constructed according to the present invention, Fig. 2 is a plan view partly in section on the line 2—2 of Fig. 1, Fig. 3 is a section on the line 3—3 of Fig. 2, the engine cylinders all being shown in longitudinal section, Fig. 4 is an enlarged longitudinal section through one of the engine cylinders and the cooperating valves, Fig. 5 is a detail plan view of a crosshead, Fig. 6 is a detail section on the line 6—6 of Fig. 5, and Fig. 7 is a detail showing a slight modification Referring to the drawings more particularly, the numerals 1 indicate a pair of pedestals or columns which are of substantial form so as to possess durability and withstand the strains imposed thereon, and these pedestals are firmly secured upon the floor of the engine room or some other substantial fixed support. Suitably journaled upon the upper ends of the pedestals 1 is a motor shaft 2 and upon this shaft, intermediate the pedestals and the ends of the shaft, is firmly secured a wheel 3 which is preferably a solid block so that it will serve as a flywheel and maintain a steady motion when the engine is operating. Formed on or rigidly secured to the flywheel 3 at intervals around the periphery of the same are the engine cylinders 4, one end of which is open and the opposite end closed and equipped with a spark plug, indicated at 5. Within each cylinder is mounted a piston 6 and a piston rod 7 extends from each piston through the open end of the cylinder and is connected to other operating parts, as will presently more fully appear. One end portion of the shaft 2 has an axial bore 8 into one end of which is fitted a fuel supply pipe 9 about which is fitted a packing box 10 to prevent leakage and immediately adjacent the wheel 3 branch fuel pipes 11 lead from the bore 8 to the respective cylinders to supply fuel thereto. The cylinders, the cooperating pistons and the several parts mounted upon the cylinders are all of identical construction and a description of one cylinder and its cooperating elements will, therefore, suffice for all, and it is to be understood that in the following description where reference is made to a cylinder it applies to all the cylinders. The branch fuel pipe 11 opens into a valve casing 12 which is mounted upon the side of the cylinder 4 immediately adjacent the spark plug and the closed end of the cylinder as is shown clearly in Fig. 4. A valve 13 is mounted within this valve casing 12 and opens inwardly so as to admit a charge of fuel into the cylinder during the operation of the engine. A stem 14 extends outwardly through the valve casing from the valve 13 and is pressed outwardly so as to normally hold the valve seated and closed by a spring 15 coiled around the stem between the valve casing and an abutment 16 on the stem. The outer end of the stem is engaged by a trip lever 17 and an anti-friction roller or ball is mounted upon the extremity of the stem to reduce the frictional wear. The trip lever 17 is fulcrumed upon a bracket 19 extending from the valve casing 12 and has two arms of different lengths which are arranged in divergent relation with the short arm bearing against the roller 18 and the long arm being equipped at its extremity with a roller 20 adapted to ride upon and be operated by a fixed cam 21, as will be hereinafter more fully set forth. At the opposite side of the cylinder is a valve casing 22 which corresponds to the valve casing 12 and which is provided with an exhaust port 23 through which the spent gases may be discharged. A valve 24 is mounted in the valve casing 22 and controls the flow of gases through the casing and the exhaust port in an obvious manner, said valve being operated by a trip lever 25 corresponding to the trip lever 17 and mounted upon a bracket 26, the trip lever 25 being operated by a fixed cam 27.

Each piston rod 7 extends to and is pivotally attached at its free or outer end to a crosshead 28, the ends of the crossheads being journaled in the outer ends of carrier arms 29 which are each in the form of a bar defining a V and having its separated ends secured upon a ring 30, two of said rings 30 being provided and each disposed around a bearing wheel or disk 31 which encircles the shaft 2 and constitutes an additional bearing therefor, and ball bearings 32 being interposed between the inner peripheries of the rings and the outer peripheries of the wheels, as clearly shown in Figs. 1 and 2 and as will be readily understood. The arms 29 which are diametrically opposite each other are mounted upon the same ring so that in a four cylinder engine, which is the type illustrated, the diametrically opposite cylinders will have their pistons working in unison, one of said pistons acting to expel spent gases while the other piston is acting to compress a fresh charge. Pivotally mounted upon the sides of the flywheel 3 are rocking arms 33 which are also disposed in pairs and have their outer ends inserted through slots 34 formed in the respective crosshead at opposite sides of the center thereof and within which are anti-friction rollers 35 bearing against the opposite sides of the rocking arm, as clearly shown in Figs. 5 and 6. The inner end of each rocking arm 33 is equipped with a friction roller 36 which is adapted to ride upon a fixed cam 37 and thereby impart movement to the respective crosshead and operate the piston so that it will travel properly within the cooperating cylinder. The fixed cams 37 are blocks arranged at the sides of the flywheel and carried by brackets 38 extending from the respectively adjacent pedestal 1 through openings provided therefor in the disk or wheel 31 to dispose the cam between said wheel and the flywheel in the path of the rollers 36 on the inner ends of the rocking arms 33, as will be understood upon reference to Figs. 1 and 2. The cams 21 and 27 are also supported in proper relation to the several cylinders at opposite sides of the flywheel by the pedestals and they consist preferably of flat bars disposed so that as the cylinders are rotated they will travel past these fixed cams which will thereupon be engaged by and will rock the trip levers 17 and 25 to operate the corresponding valves.

Secured upon the flywheel adjacent each cylinder is a switch or circuit breaker and maker 39 consisting of two cooperating elements which are separated by insulation at one end, as indicated at 40, one of said members being rigidly attached to the flywheel and the other member being preferably a resilient leaf having a contact point at its free end, as shown at 41. The circuit breakers are suitably connected electrically with a battery, a magneto or other source of electric energy which may be of any preferred form and which is not illustrated herein as, in itself, it forms no part of the invention. It will also be understood that there is provided a carbureter which may be of any approved form and from which the fuel supply pipe 9 leads to supply the carburetted fuel to the several cylinders through the branch fuel pipes 11.

Adjacent one point of the periphery of the flywheel 3, there is provided an abutment or stop bar 42 which extends at a right angle to the flywheel and the cylinders thereon and is provided adjacent its ends with guide pins 43 arranged to play within guide cylinders 44 supported by an auxiliary frame 45 or in such other manner as may be preferred. The cylinders 44 are provided with slots 46 in their sides to permit movement of the bar 42 and between the closed ends of these cylinders and the outer edge of the bar 42 are springs 47 which yieldably hold the bar in a retracted position. At the ends of the bar 42 are rigid extensions or arms 48, the inner ends of which are pivoted to levers 49 which are fulcrumed at their opposite ends upon posts 50 secured rigidly to the adjacent pedestals 1 and extending therefrom, as will be understood and as indicated in Fig. 1. Fixed to the shaft 2 at the outer sides of the respective pedestals 1 are cam wheels 51 each of which has four depressions or cam surfaces 52 in its periphery, and carried by the lever 49 is a lug 53 equipped with a friction roller 54 which rides upon the periphery of the adjacent cam wheel so that the lever 49 will be rocked at proper intervals to attain the desired operation of the engine.

From the foregoing description, taken in connection with the accompanying drawings, it is thought the operation of the engine will be readily understood and appreciated. Assuming that the cylinder 4 at the bottom of Fig. 1 has just received a charge of fresh fuel and the machine is rotating in the direction of the large arrow at the left of the figure, the fresh charge will be compressed while the cylinder is traveling from the position at the bottom of the figure to the position at the right of the same, the rocking arm 33 being rocked as it passes the stationary cam 37 so that the piston will be given a rate of travel faster than the cylinder and, consequently, by the time the cylinder has reached the position at the right the piston will be close to the closed end of the cylinder, as shown in Fig. 3. When the cylinder reaches the position at the right, the switch or circuit closer 39 which follows the cylinder will be brought into a position directly adjacent and alined with the sliding abutment or bar 42 and just as the crosshead 28 clears the path of said bar the roller 54 carried by the lever 49 will drop into one of the recesses or cam surfaces of the wheel 51 so that the springs 47 will expand and drive the bar into the position shown in Fig. 1, being thereby disposed immediately at the rear of the corresponding crosshead and caused to impinge upon the outer member of the switch 39 so as to close said switch and fire the spark plug, thereby exploding the charge of fuel in the cylinder. The piston will be prevented from moving toward the rear end of the cylinder by the abutment bar 42 so that the force of the explosion will be exerted against the closed end or head of the cylinder and the cylinder will be forced to travel in a direction away from the abutment. Inasmuch as the cylinder is fixed to or an integral part of the flywheel 3, the flywheel must rotate and impart the desired movement to the shaft 2 which is, of course, connected with machinery to be driven. The firing period of the cycle of operation will carry the cylinder to the position shown at the top of Fig. 1 and the roller 54 will, of course, ride out of the recess in the wheel 51 and cause the abutment 42 to be returned to its outer position so that it will not interfere with the travel of the following cylinder. When the fired cylinder reaches the position shown at the top of Fig. 1, the exhaust valve thereon will be brought against the fixed cam 27 and will be opened so that the spent gases may be discharged therefrom. The rocking arm 33 connected with the piston of said cylinder will thereupon be caused to ride over the adjacent fixed cam 37 and will be oscillated so that the piston will be driven forward in the cylinder to expel the spent gases, and the continued travel of the cylinder will bring it into the position shown at the left of Fig. 1, whereupon the exhaust valve will be closed and the inlet valve will be opened through the engagement of the corresponding trip lever with the stationary cam 21. The continued travel of the wheel will carry the cylinder to the initial position at the bottom of the figure and the piston will then be moved forward to compress the charge, as previously stated.

It will be readily noted that for purposes of illustration I have shown a four cycle engine with four cylinders so that at each step of the cycle of operation one cylinder will be firing, one cylinder will be taking a fresh charge, one cylinder will be compressing a fresh charge, and the fourth cylinder will be exhausting the spent gases. The cylinders being fixed to a flywheel of considerable mass which is secured positively to the shaft and the supply of fuel being carried through the axis of said shaft to branch fuel pipes which revolve with the shaft and the cylinders, the cylinders will be fed with fuel automatically and at the proper intervals and the power generated by the explosions in the successive cylinders will be transmitted directly to the shaft through the flywheel.

In Figs. 1 to 4, the cylinders are shown in conventional straight form but they may be arcuate from end to end as shown at 55 in Fig. 7, the piston 56 and piston rod 57 being correspondingly shaped.

At the outer end of each rocking arm 33 is a stop pin 60 which arrests the outward movement of the crosshead and thereby prevents the piston from moving out of the cylinder.

Having thus described the invention, I claim:

1. An internal combustion rotary engine comprising a fixed support, a flywheel, a shaft journaled in said support and upon which the flywheel is secured, cylinders fixed upon the peripheral edge of the flywheel and centered with respect to the opposite side faces thereof, pistons working in the cylinders, means for supplying fuel to the respective cylinders, cooperating means on the flywheel and the support to operate the pistons, an abutment slidably mounted adjacent the path of the cylinders, means driven by the shaft for disposing said abutment across the path of the cylinders to receive the thrust of a piston when the cylinder containing said piston is fired, and yieldable means for returning the abutment to normal position after firing the cylinder.

2. A rotary internal combustion engine comprising a fixed support, a shaft journaled in the support, a flywheel fixed upon the shaft, fixed cylinders seated in the peripheral edge of the flywheel and projecting beyond the opposite side faces thereof, an annular support provided about the shaft on each side of the flywheel, rings rotatably fitted upon the annular supports, crossheads disposed radially beyond the flywheel and transverse thereto, connections between the crossheads and the pistons, and arms connecting the crossheads with the respective rings.

3. A rotary internal combustion engine comprising a fixed support, a shaft journaled in said support, a flywheel secured upon the shaft, spaced cylinders rigidly secured to the peripheral edge of the flywheel and centered with respect to the opposite side faces thereof, pistons working in the cylinders, means whereby the cylinders will be charged, fired and discharged during the rotation of the flywheel, a spring pressed abutment slidably mounted adjacent the firing position of the cylinders, cam wheels fixed upon the shaft, and means actuated by said cam wheels to normally hold the abutment out of the path of the cylinders and to move it into position to receive the thrust of a piston during the firing step in the operation.

4. A rotary internal combustion engine comprising a fixed support, a shaft journaled in the support, a flywheel fixed upon the shaft, cylinders secured to the peripheral edge of the flywheel and centered with respect to the opposite side faces thereof, pistons working in the respective cylinders, means for shifting the pistons within the cylinders, a spring pressed abutment block slidably mounted adjacent the firing position, cam wheels secured upon the shaft at the sides of the flywheel, arms extending from the abutment, and levers pivoted to said arms and resting on and actuated by said cam wheels whereby the abutment will be moved against the tension of its spring into position to receive the thrust from the piston in a fired cylinder and retracted to permit the passage of a following cylinder.

5. An internal combustion rotary engine comprising a fixed support, a shaft journaled in the support, a flywheel fixed on the shaft, spaced cylinders secured about the peripheral edge of the flywheel and centered with respect to the opposite side faces thereof, pistons in the cylinders, crossheads disposed radially beyond the flywheel and transverse thereto and having openings near their ends, piston rods connecting the respective crossheads and pistons, rocking arms pivoted on the sides of the flywheel and having their outer ends engaged through the openings in the respective crossheads, and fixed cams on the support in the path of the inner ends of said arms whereby the arms will be rocked and the pistons actuated to admit, compress and expel a charge.

CARL GUSTAF GUSTAFSON. [L.S.]